United States Patent Office 2,722,592
Patented Nov. 1, 1955

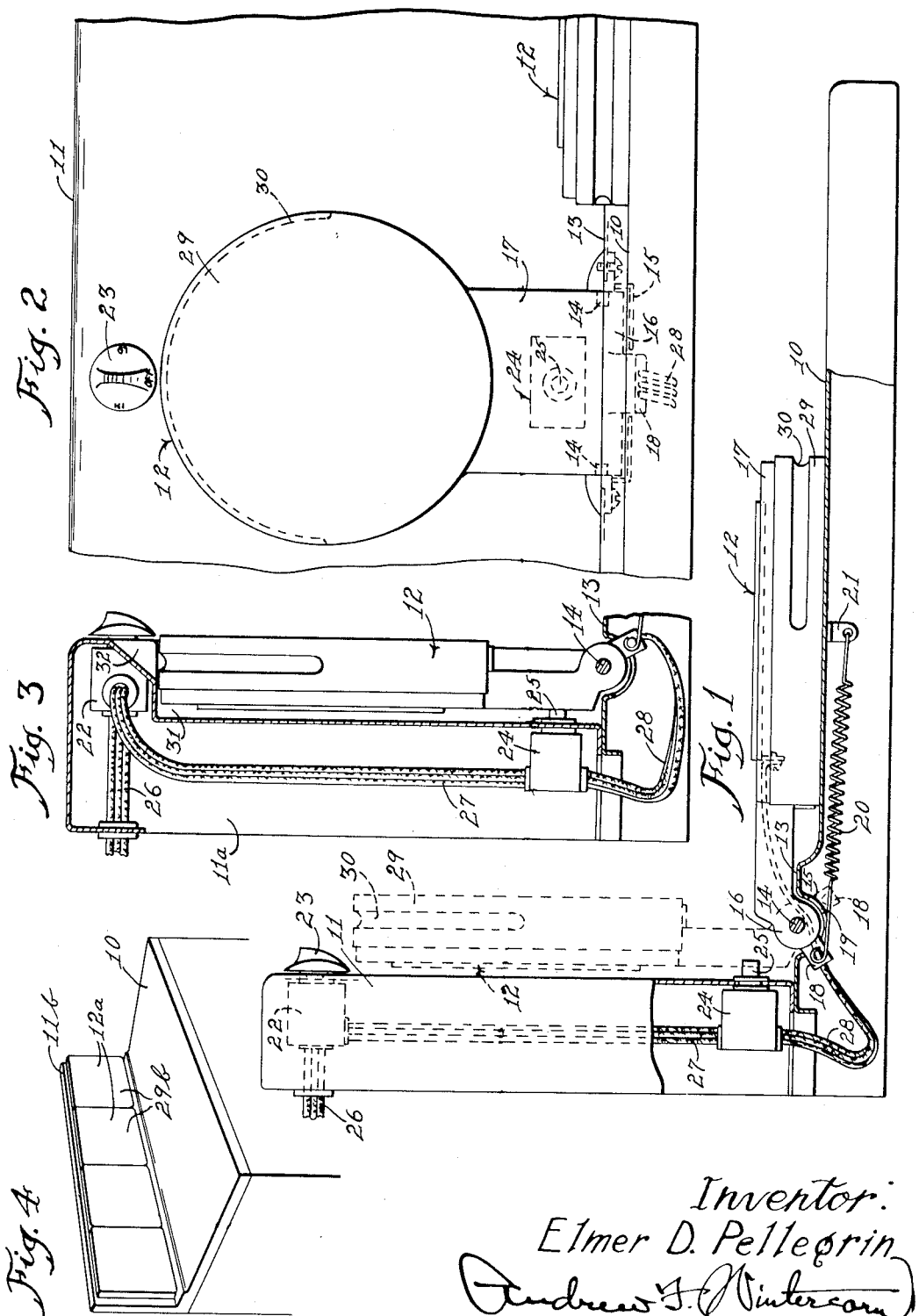

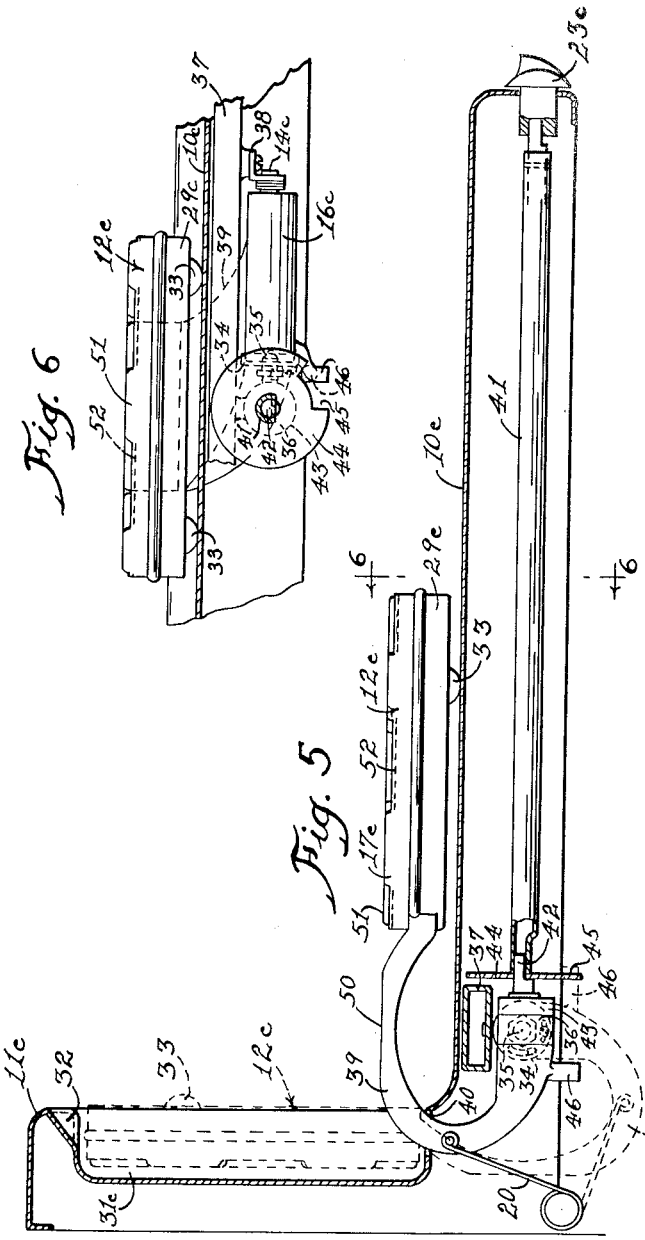

2,722,592

RANGE COOKING TOP AND BURNERS OR HEATING ELEMENTS THEREFOR

Elmer D. Pellegrin, Woodstock, Ill., assignor to Dixie Products, Inc., Cleveland, Tenn., a corporation of Tennessee Application January 22, 1948, Serial No. 3,664

14 Claims. (Cl. 219—37)

This invention relates to cooking ranges generally and is more particularly concerned with improvements in the cooking top and burners or heating elements therefor, and, although herein disclosed as applied to gas and electric ranges, the invention is not limited to those applications but may be applied also to ranges operated with oil, gasoline, kerosene, bottled gas, etc.

The principal object of my invention is to provide a cooking range of table top height having the usual low splasher-back but having burners or heating elements which are so designed that the entire cooking top can be cleared so that it is usable in the same way as any other table top, the burners or heating elements being all of the same length bearing such relation to the height of the splasher-back that when they are disposed vertically in front of the splasher-back, all on the same pivotal axis, they will not extend above the top thereof, and, when laid down for use, will take up only the rear half, or less, of the space on the cooking top, leaving ample work space clear in front, these burners or heating elements being preferably pivotally mounted at the rear portion of the top to be swingable upwardly and rearwardly from a horizontal operative position resting on the top to an out-of-the-way position in front of or in recesses in the splasher-back, the bases for the burners and heating elements being preferably either enameled, or of stainless steel, plastic, or glass to match or give a desired contrast to the enamel, stainless steel, plastic or glass of the cooking top and splasher-back for a neat and attractive appearance.

Where the burners and heating elements fit in recesses in the splasher-back, the bases preferably lie substantially flush with the front face of the splasher-back in their out of the way position, and suitable finger grips are provided on these base portions to facilitate swinging the burners and heating elements forwardly and downwardly to operative position on the cooking top.

The burners and heating elements, in accordance with my invention, have springs connected thereto so as to counterbalance the same against being dropped violently onto the cooking top.

Each of the burners, in accordance with my invention also has means associated with its gas cock for automatically preventing the turning on of gas to the burner while it is in the raised retracted position, the electrical heating elements being similarly protected against having circuits completed therethrough when they are disposed in raised retracted positions.

The invention is illustrated in the accompanying drawings, wherein—

Fig. 1 is a vertical section through the rear portion of the cooking top of an electric range equipped with hinged, retractable heating elements in accordance with my invention, an element being shown in full lines in lowered operative position and in dotted lines in raised retracted position;

Fig. 2 is a front view of Fig. 1, showing the heating element raised, and indicating a portion of a neighboring element in the lowered operative position like that of Fig. 1;

Fig. 3 is a view like Fig. 1 but showing the invention applied to a range with a different splasher-back;

Fig. 4 is a perspective view of another cooking top showing how four heating elements appear in retracted position where they have rectangular bases, as distinguished from the circular ones shown in Figs. 1–3;

Fig. 5 is a view like Fig. 1 but showing my invention applied to a gas range, and Fig. 6 is a cross-section on the line 6—6 of Fig. 5.

Similar reference numerals are applied to corresponding parts throughout the views.

Referring to Figs. 1 and 2, the reference numeral 10 designates the cooking top of an electric range, and 11 is the splasher-back, in front of the base of which a plurality of electric heating elements 12, usually four, are hingedly mounted on the raised rear portion 13 of the top 10, as indicated at 14, so as to be swingable from an operative position, resting substantially horizontally on the cooking top, as appears in full lines in Fig. 1, to a retracted substantially vertical position parallel to the splasher-back, as appears in dotted lines in Fig. 1, whereby to make practically the whole cooking top clear and usable the same as any other table top, the top 10 being incidentally at table top height, as is customary in recent designs of ranges, and being without joints or other breaks in the top surface as shown clearly in Fig. 4. The raised portion 13 of the cooking top has arcuate depressed portions 15 to accommodate the movable offset or L-shaped knuckle portions 16 provided on the hinged ends of the bodies 17 of the electric heating elements 12, and these knuckles 16 have radial fingers 18 projecting therefrom through elongated slots 19 in the depressed portions 15 for connection with tension springs 20, whereby the heating elements 12 are counterbalanced against being dropped violently onto the cooking top. The springs 20 are anchored to the underside of the cooking top 10, as indicated at 21, and are stretched when the heating elements 12 are swung downwardly, as should be clear from a comparison of the dotted and full line positions shown in Fig. 1. On the other hand, it should be evident that, due to the offset relationship of the pivots 14 to the bodies of the heating elements, the heating elements when disposed in vertical position tend to bear against the splasher back under their own weight and independently of any remaining tension in springs 20, as should be clear from the dotted line raised position in Fig. 1 and the full line raised position in Fig. 3. Individual to each heating element 12 is a switch 22 preferably, but not necessarily, mounted in the splasher-back 11, with its operating knob or dial 23 rotatable in front of the panel, as shown. Each element 12 also has a safety switch 24 mounted adjacent the same on the splasher-back with a spring-pressed button or plunger 25 projecting forwardly therefrom and arranged to be depressed to open-circuit position by the hinged portion of the body 17 of the heating element when the said element is raised to retracted position, as indicated in dotted lines in Fig. 1, whereby automatically to break the circuit for said element if the switch 22 is left turned on, and prevent damage to the splasher-back and also waste of current if the switch 22 is turned on after the element has been raised to retracted position, the main switch 22 having the line conductors 26 connected thereto, and the safety switch 24 being connected in series between switch 22 and element 12, as indicated at 27 and 28, to control flow of current to the element 12 independently of switch 22. The base or back covering 29 for each element 12 is illustrated as of enameled sheet metal, like the top 10, and provided with a finger-grip groove 30 on the outer periphery to facilitate pulling the unit down and raising it again. However, these bases 29 may be of stainless steel, plastic, or glass, to match the construction of the top 10 and back 11, or give a pleasing contrast.

The operation of the invention is believed to be clear from the above description. It greatly increases the utility, as well as improves the appearance, of the range. The cooking top heating elements are not used a large fraction of the time, as, for example, during baking, and it is therefore a big advantage for the housewife at such times to be able to use the top 10 as another table top. Furthermore, with my invention, there is always more of the working space on the top 10 available for use than in other ranges, whenever less than the whole set of heating elements is in use.

It should also be clear that the present arrangement is an improvement over prior arrangements even when all four burners or heating elements are in operation at one time. Take, for example, for comparison, burners or heating elements in the form of the conventional fixtures disposed in spaced staggered relationship on the cooking top, two in front and two in the rear; the present arrangement of the heating elements in a row across the rear half portion of the cooking top affords greater convenience by virtue of the unbroken stretch of working surface afforded on the front half portion of the cooking top from one end of the range to the other, and the fact that with that arrangement the housewife can move any utensil without any danger of possibly upsetting another and without having to reach over another utensil or over a burner or heating element. In passing, it will also be noticed that the bodies 17 of the heating elements 12 are shaped so that there is no danger of upsetting a utensil if the housewife in placing it does not happen to get it exactly centered or if she moves it purposely to the rear more or less off the hot element, as when food is merely to be kept warm and is not to be cooked further. Where the bodies of the heating elements fit in recesses 31 in the splasher-back 11a, as in Fig. 3, the appearance of the range is further improved, especially if the bases 29 are made to lie substantially flush with the front face of the back 11a in the retracted position of the elements. The back 11a has depressions 32 above the recesses in which to enter a finger tip in taking hold of a selected element to swing it down to operative position. On the other hand, the bodies of the heating elements may be made rectangular as shown at 12a in Fig. 4 and made to lie in close proximity with their bases 29b arranged substantially flush with one another in retracted position, and these may be disposed in front of the back 11b or in a common recess provided therefor in said back, as desired, similarly as in Figs. 1 and 3, respectively.

Referring next to Figs. 5 and 6, the invention is shown applied to a gas range in which a plurality of burners 12c, usually four, are hingedly mounted by means of hollow knuckle portions 16c under the rear portion of the cooking top 10c for swinging movement from an operative position resting by means of rubber or plastic bumpers or feet 33 on the top 10c, to a retracted position disposed vertically in recesses 31c provided in the front face of the splasher-back 11c. Each burner has a gas and air mixer 34 provided on one end of the knuckle portion 16c into which a gas discharge jet 35, extending laterally from the body of a gas cock 36, projects to deliver gas from the manifold 37 to burner along with entrained air admitted through the mixer 34, the jet serving also as one of the two coaxial pivots for said burner, the other of which is indicated at 14c supported in a bracket 38 that is fastened to the manifold 37. A gooseneck shaped mixing tube 39, that is struck on an arc with the axis of pivots 35 and 14c as a center, connects the ported body 17c of the burner with the knuckle 16c and operates through a slot 40 in the back 11c in the bottom of the recess 31c, as shown. The manifold 37 is suitably supported in the frame of the range in rigid relationship to the top 10c, and a grasshopper type torsion spring 20c that is suitably anchored to the frame of the range, under the cooking top 10c, is connected to the tube 39, as indicated so as to be loaded in the lowering of the burner to operative position whereby to counterbalance the same against being dropped violently onto the cooking top. The burners 12c, while shown as round to fit in round recesses 31c, may be of rectangular or any other desired shape.

Each burner is individually controlled and regulated from the front of the range, there being a knob or dial 23c connected by a tube 41 with the stem 42 of the associated cock 35 to turn the ported valve disc 43 thereof from an "off" to an "on" position with as much or little gas discharge to the burner as desired. A disc 44 is fixed nonrotatably on stem 42 to turn with the stem when the gas is turned on or off. This disc has a notch 45 therein into which a lug 46 projecting radially from the knuckle portion 16c of the burner is arranged to engage when the burner is swung upwardly to retracted position, as shown in dotted lines in Figs. 5 and 6, whereby to prevent turning the gas on to the burner while it is in such retracted position. The knob 23c is arranged to be turned in a clockwise direction toward "on" position and, as shown in Fig. 6, the lug 46 in the up position of the burner blocks such movement, thereby preventing having the gas turned on when it should not be. The same means also prevents one from moving a lighted burner from operative position to retracted position, as should be obvious from the foregoing description. On the back or bottom of each burner is a removable easily cleanable casing 29c which, as in the other constructions of Figs. 1–4, may be made to match the top 10c or made to give a pleasing contrast, the casing being of sheet metal, plastic, or glass, as desired.

The gas range of Figs. 5 and 6 operates similarly as the electric ranges of Figs. 1–4, in so far as the facility with which the cooking top 10c may be cleared for use as a table top, is concerned, whenever that is desired. In this form, as in the other, the utensils may be pushed to the rear from the burners without danger of upsetting, the mixing tubes 39 having flat top surfaces 50 in the same horizontal plane with the tops of the burners. The latter have upwardly projecting utensil supporting bosses 51, as shown, and the ports 52 are spaced sufficiently below the top surfaces of these bosses to insure a good supply of secondary air to support combustion.

It is believed to be clear that ranges operated with oil, gasoline, kerosene, or bottled gas can be constructed along closely similar lines to that of Figs. 5 and 6 to operate similarly and give similar advantages.

It is believed the foregoing description conveys a good understanding of the objects and advantages of my invention. The appended claims have been drawn to cover all legitimate modifications and adaptations.

I claim:

1. A cooking apparatus comprising a range having in a single panel a smooth top work section presenting a single unbroken working area devoid of cracks and openings of any kind with a fixed upright back splasher at the rear thereof which is of small height in relation to the fore and aft dimension of said top, and a plurality of cooker elements of elongated form and disposed side by side and having offset inner end portions pivoted relative to said top section adjacent the back splasher for swinging movement singly or not as desired from a retracted position in a substantially vertical plane adjacent and substantially parallel to said back splasher, in which position they gravitate toward the splasher back under their own weight, to an operative position extending forwardly from the back splasher and resting substantially horizontally on the rear portion of the top section, all of said cooker elements being of the same length and pivoted in coaxial relation, the length of said cooker elements bearing such relation to the height of the back splasher that when they are disposed vertically in front of the back splasher they do not extend above the top thereof, and, when laid down for use, will take up only the rear portion of the space on the cooking top, leaving ample work space clear in front.

2. A cooking apparatus comprising a range having in a single panel a smooth top work section presenting a single unbroken working area with a fixed upright back splasher at the rear thereof, which is of small height in relation to the fore and aft dimension of said top, a plurality of electrical cooker elements of elongated form and disposed side by side and having inner end portions pivoted relative to said top section adjacent the back splasher for swinging movement singly or not as desired from a retracted position in a substantially vertical plane adjacent and substantially parallel to said back splasher to an operative position extending forwardly from the back splasher and resting substantially horizontally on the rear portion of the top section, all of said cooker elements being of the same length and pivoted in coaxial relation, the length of said cooker elements bearing such relation to the height of the back splasher that when they are disposed vertically in front of the back splasher they do not extend above the top thereof, and, when laid down for use, will take up only the rear portion of the space on the cooking top, leaving ample work space clear in front, manually operable switch means controlling supply of current to each cooker element, and a normally closed safety switch associated with each of said cooker elements connected in circuit with the related manual switch and located at the lower portion of said back splasher and having a spring-pressed button for operating the safety switch to open circuit position when depressed, said button being held under spring pressure projecting forwardly from the back splasher in such relation to the pivoted inner end of the cooker element to be automatically depressed to open circuit when the cooker element is raised to vertical retracted position.

3. A cooking apparatus comprising a range having a smooth top work section presenting an unbroken working area with an upright back splasher at the rear thereof which is of small height in relation to the fore and aft dimension of said top, a gas supply manifold under the rear portion of said top section having plurality of gas cocks depending from it, gas burning cooker elements resting on said top section and each having an arcuate mixing tube extending downwardly and forwardly under said top section from the rear portion of the cooker element and pivotally connected with one of said cocks to receive gas therefrom, each cooker element being swingable rearwardly to a retracted position at the rear of said top section and disposed substantially vertically in front of said back splasher, all of said cooker elements being of the same length and pivoted in coaxial relation, the length of said cooker elements bearing such relation to the height of the back splasher that when they are disposed vertically in front of the back splasher they do not extend above the top thereof, and, when laid down for use, will take up only the rear portion of the space on the cooking top, leaving ample work space clear in front, a cock operating rod extending forwardly under the top section from each of said cocks to the front of said top section, and a manually operable knob on the front end of said rod.

4. A cooking apparatus as set forth in claim 3 including spring means operatively connected with said mixing tube under said top section so as to resist downward movement of the cooking element onto said top section.

5. A cooking apparatus as set forth in claim 3 including a locking plate turning with said cock operating rod and having an opening provided therein into which a projection provided on the mixing tube of said cooker element is arranged to engage in the retracted position of said cooker element to lock said cock in "off" position and prevent turning the same to "on" position so long as said cooker element remains in retracted position.

6. A cooking apparatus as set forth in claim 3 including spring means operatively connected with said mixing tube under said top section so as to resist downward movement of the cooking element onto said top section, the main body portion of said cooker element in the operative position being spaced forwardly appreciably relative to the back splasher, and said mixing tube being formed with a relatively wide forwardly reaching upper portion extending to the rear of said body portion, the top of which is substantialy in coplanar relationship with the top of the body portion of said cooker element so as to provide an auxiliary supporting surface for a cooking utensil.

7. A cooking apparatus comprising a range having in a single panel a smooth top work section presenting a single unbroken working area devoid of cracks and openings of any kind with a fixed upright back splasher at the rear thereof which is of small height in relation to the fore and aft dimension of said top, a plurality of cooker elements of elongated form and disposed side by side and having offset inner end portions pivoted relative to said top section adjacent the back splasher, springs individual to the several cooker elements below the top work section fixed at one end relative to said section and having the other end connected to the pivoted inner end portions of said cooker elements so as to be loaded in the lowering of said elements, whereby to counterbalance said cooker elements and prevent droppage thereof accidentally onto the top of said work section, said cooker elements being swingable singly or not as desired from a retracted position in a substantially vertical plane adjacent and substantially parallel to said back splasher, in which position they gravitate toward the splasher back under their own weight independently of said springs, to an operative position extending forwardly from the back splasher and resting substantially horizontally on the rear portion of the top section, all of said cooker elements being of the same length and pivoted in coaxial relation, the length of said cooker elements bearing such relation to the height of the back splasher that when they are disposed vertically in front of the back splasher they do not extend above the top thereof, and, when laid down for use, will take up only the rear portion of the space on the cooking top, leaving ample work space clear in front.

8. A cooking apparatus comprising a range having in a single panel a smooth top work section presenting a single unbroken working area devoid of cracks and openings of any kind with a fixed upright back splasher at the rear thereof which is of small height in relation to the fore and aft dimensions of said top, a plurality of cooker elements of elongated form and disposed side by side and having inner end portions pivoted relative to said top section adjacent the back splasher, springs individual to the several cooker elements below the top work section fixed at one end relative to said section and having the other end connected to the pivoted inner end portions of said cooker elements so as to be loaded in the lowering of said elements, whereby to counterbalance said cooker elements and prevent droppage thereof accidentally onto the top of said work section, said cooker elements being swingable singly or not as desired from a retracted position in a substantially vertical plane adjacent and substantially parallel to said back splasher to an operative position extending forwardly from the back splasher and resting substantially horizontally on the rear portion of the top section, all of said cooker elements being of the same length and pivoted in coaxial relation, the length of said cooker elements bearing such relation to the height of the back splasher that when they are disposed vertically in front of the back splasher they do not extend above the top thereof, and, when laid down for use, will take up only the rear portion of the space on the cooking top, leaving ample work space clear in front.

9. An electric range comprising a substantially horizontal cooking top, an upstanding hollow backsplash panel positioned adjacent to the rear of said cooking top, a plurality of hollow structures each including spaced-apart outer and inner walls and a connecting marginal wall, a plurality of hinge mechanisms respectively mounting said structures adjacent to the junction between said cooking top and said backsplash panel in side-by-side relation for independent movements between upstanding normal positions disposed adjacent to said backsplash panel and forwardly projecting work positions disposed over said cooking top, said outer walls being disposed substantially in lateral upstanding alignment with each other when said structures occupy their normal positions in order to lend an unbroken appearance to the front of said backsplash panel and to present said cooking top as a continuous usable work surface, said inner walls being disposed substantially in lateral horizontal alignment with each other when said structures occupy their work positions in order to provide a substantially continuous cooking shelf positioned above said cooking top, a plurality of electric heating units respectively carried by said inner walls and respectively movable with said structures, flexible electrical wiring arranged in said backsplash panel and electrically connected to said heating units and accommodating the movements of said structures, a source of current supply, and a plurality of control switches carried by said backsplash panel and disposed substantially in lateral horizontal alignment above said structures when they occupy their normal positions, said control switches respectively corresponding to said heating units and being respectively associated with said structures, each of said control switches being of the multi-position type and selectively operative to its different positions to establish corresponding different heating connections between the corresponding one of said heating units and said source of current supply via said flexible wiring.

10. An electric heating appliance comprising a substantially horizontal work platform, an upstanding hollow casing positioned at the rear of said work platform and including spaced-apart front and rear walls and a connecting boundary wall, said casing having an upstanding cavity provided therein and opening through said front wall, a hollow structure including spaced-apart outer and inner walls and a connecting marginal wall, hinge mechanism mounting said structure upon said casing for movements between an upstanding normal position disposed within said cavity and a substantially horizontal work position removed from said cavity and arranged over said work platform, said outer wall being disposed substantially flush with said front wall when said structure occupies its normal position in order to lend an unbroken appearance to the front of said casing, said work platform presenting a continuous usable work surface when said structure occupies its normal position, said inner wall having an opening formed therein, an electric heating unit arranged in said opening and movable with said structure, flexible electrical wiring arranged in said casing and electrically connected to said heating unit and accommodating the movements of said structure, a source of current supply, a heating control circuit including said source and said flexible wiring, a control switch of the multi-position type selectively operative to its different positions to establish corresponding different heating connections between said heating unit and said heating control circuit, a master switch included in said heating control circuit and having open and closed positions, and means responsive to movement of said structure into its normal position for operating said master switch into its open position and responsive to movement of said structure into its work position for operating said master switch into its closed position.

11. An electric range comprising a substantially horizontal cooking top, an upstanding hollow backsplash panel positioned adjacent to the rear of said cooking top, a plurality of hollow structures each including spaced-apart outer and inner walls and a connecting marginal wall, a plurality of hinge mechanisms respectively mounting said structures adjacent to the junction between said cooking top and said backsplash panel in side-by-side relation for independent movements between upstanding normal positions disposed adjacent to said backsplash panel and forwardly projecting work positions disposed over said cooking top, said outer walls being disposed substantially in lateral upstanding alignment with each other when said structures occupy their normal positions in order to lend an unbroken appearance to the front of said backsplash panel and to present said cooking top as a continuous usable work surface, said inner walls being disposed substantially in lateral horizontal alignment with each other when said structures occupy their work positions in order to provide a substantially continuous cooking shelf positioned above said cooking top, a plurality of electric heating units respectively carried by said inner walls and respectively movable with said structures, flexible electrical wiring electrically connected to said heating units and accommodating the movements of said structures, a source of current supply, and a plurality of control switches respectively corresponding to said heating units, each of said control switches being of the multi-position type and selectively operative to its different positions to establish corresponding different heating connections between the corresponding one of said heating units and said source of current supply via said flexible wiring.

12. A cooking apparatus comprising a range having in a single panel a smooth top work section presenting a single unbroken working area with a fixed upright back splasher at the rear thereof, which is of small height in relation to the fore and aft dimension of said top, a plurality of electrical cooker elements of elongated form and disposed side by side and having inner end portions pivoted relative to said top section adjacent the back splasher for swinging movement singly or not as desired from a retracted position in a substantially vertical plane adjacent and substantially parallel to said back splasher to an operative position extending forwardly from the back splasher and resting substantially horizontally on the rear portion of the top section, all of said cooker elements being of the same length and pivoted in coaxial relation, the length of said cooker elements bearing such relation to the height of the back splasher that when they are disposed vertically in front of the back splasher they do not extend above the top thereof, and, when laid down for use, will take up only the rear portion of the space on the cooking top, leaving ample work space clear in front, manually operable switch means controlling supply of current to each cooker element, and a normally closed safety switch associated with each of said cooker elements connected in circuit with the related manual switch and located at the lower portion of said back splasher, each safety switch having means responsive to movement of the related cooker element to vertical retracted position for operating said safety switch to open position and responsive to movement of the related cooker element to lowered position for operating said safety switch to closed position.

13. A cooking apparatus comprising, a support having a freely upstanding hollow backsplash panel extending upwardly therefrom, a plurality of hollow structures each including spaced-apart outer and inner walls and a connecting marginal wall, a plurality of hinge mechanisms respectively mounting said structures adjacent to the junction between said support and said backsplash panel in side-by-side relation for independent swinging movements about a common axis forwardly of said backsplash panel between upstanding normal positions disposed adjacent to but forwardly of said backsplash panel and forwardly projecting horizontal work positions, said outer walls being disposed substantially in lateral upstanding alignment with each other when said structures occupy their upstanding normal positions, said inner walls being disposed substantially in lateral horizontal alignment with each other when said structures occupy their work positions in order to provide a substantially continuous cooking shelf, a plurality of heating units respectively carried by said inner walls and respectively movable with said structures.

14. A cooking apparatus as defined in claim 13, wherein the outer and inner walls of said hollow structures are of rectangular shape with adjacent edges of said structures in close proximity to each other whereby said structures define a substantially continuous surface when in their upstanding normal positions.

References Cited in the file of this patent

UNITED STATES PATENTS

| Number | Name | Date |
|---|---|---|
| 968,942 | Hartig | Aug. 30, 1910 |
| 999,622 | Allen | Aug. 1, 1911 |
| 1,258,655 | Craw | Mar. 12, 1918 |
| 1,590,692 | Lewis | June 29, 1926 |
| 1,786,120 | Lynam | Dec. 23, 1930 |
| 1,885,041 | Baker | Oct. 25, 1932 |
| 1,948,402 | Teller et al. | Feb. 20, 1934 |
| 1,989,224 | Beltram | Jan. 29, 1935 |
| 2,004,937 | Fletcher | June 18, 1935 |
| 2,013,931 | Teller et al. | Sept. 10, 1935 |
| 2,021,651 | Gutmann | Nov. 19, 1935 |
| 2,077,687 | Goldbert | Apr. 20, 1937 |
| 2,109,006 | Davis | Feb. 22, 1938 |
| 2,171,632 | Pletcher | Sept. 5, 1939 |
| 2,207,307 | Teller | July 9, 1940 |
| 2,252,753 | Brodbeck | Aug. 19, 1941 |
| 2,292,735 | Besocke | Aug. 11, 1942 |
| 2,417,977 | French | Mar. 25, 1947 |

FOREIGN PATENTS

| Number | Country | Date |
|---|---|---|
| 13,137 | Great Britain | of 1904 |